3,047,416
METHOD FOR MAKING LUMINESCENT ARTICLES

Arthur W. Winston, Lexington, Mass., assignor to National Research Corporation, Cambridge, Mass., a corporation of Massachusetts
No Drawing. Filed May 13, 1959, Ser. No. 812,814
4 Claims. (Cl. 117—33.5)

This invention relates to luminescent materials or phosphors and more particularly to a method of controlling the color of cathodoluminescent and electroluminescent phosphors. This application is a continuation-in-part of the copending application of Winston, Serial No. 779,784, filed on December 11, 1958.

It is an object of this invention to provide a method of controlling the color of cathodoluminescent and electroluminescent phosphors during the vapor deposition of phosphors.

Other objects will become apparent and the invention better understood from a consideration of the following examples and description.

A simplified flow diagram of the method is as follows:

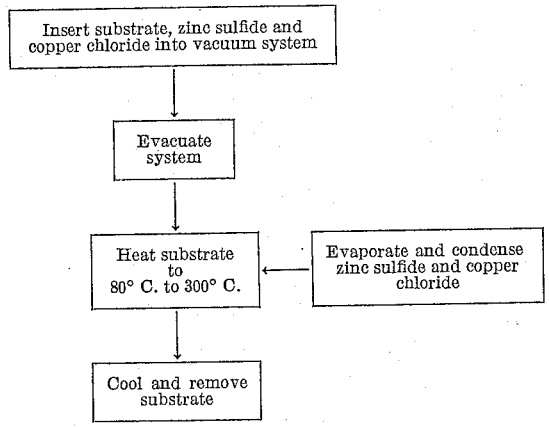

Briefly stated, the invention comprises controlling the accommodation coefficients of the activating materials by varying the substrate temperature thereby changing the amounts and ratios of the activating materials deposited and hence effecting the energy level structure due to the activating materials and consequently the energy or wavelength of the emitted radiation.

In the production of cathodoluminescent and electroluminescent films, a process has been developed which essentially consists of the step of vacuum depositing a phosphor film on a substrate. In one embodiment, a host material (such as zinc sulfide) is simultaneously deposited with activating materials. The activating materials may, for example, comprise an activator which is an electron acceptor (such as copper) and a coactivator which is an electron donor (such as chlorine).

In order to obtain luminescence, it is necessary that the deposited film have a definite crystal structure and that the conditions of depositing the film must be such that the activator and coactivator can migrate into the crystal lattice. It has been ascertained that the formation of the proper crystal structure, with the proper placement of activating materials to produce a cathodoluminescent or electroluminescent phosphor, requires a substrate temperature considerably above room temperature. A temperature of approximately 200° C. is a suitable temperature. The temperature range for proper crystal formation, as described in the parent application of Winston, Serial No. 779,784, filed on December 11, 1958, is between 80° C. and 300° C.

The evaporation of the phosphor film-forming constituents may be performed in divers manners. A prepared phosphor may be evaporated from a single boat; a host material and the activating material may be evoporated simultaneously from separate boats; compounds and elements which form the host material and compounds and elements which form the activating materials may be evaporated simultaneously from separate boats.

For the purpose of simplicity of description and examples, reference will be made only to the use of prepared zinc sulfide activated with copper and chlorine. The invention may be carried out using other phosphors or zinc sulfide having other activating materials.

According to the present invention, it has been found that, as the temperature of the substrate is elevated above 200° C. to approximately 270° C., there is a color change from green to blue for the activated zinc sulfide as described below.

It was then postulated that, as the temperature of the substrate is raised, the accommodation coefficients of the activating materials are altered and hence the amounts and ratios of the activating materials in the deposited phosphor film. For example, it has been experimentally determined that when the substrate temperature is greater than 330° C., at the rate of evaporation used, the accommodation coefficient for the condensation of host materials was zero. The term accommodation coefficient, as used in the specification and claims, is defined as the ratio between the number of molecules which actually condense on the surface of the substrate and the number of molecules which strike the surface of the substrate. Thus, the accommodation coefficient is primarily a function of the temperature of the substrate and the density of incident molecules at the substrate surface (i.e., the rate of evaporation). Other factors such as cleanliness of the substrate and nature of the substrate would also affect the accommodation coefficient.

Since the activating materials are present in small amounts, a change in their accommodation coefficients will significantly change the energy level structure of the deposited phosphor film. The host material which forms the substantial portion of the phosphor film will be normally only negligably affected by a change in its accommodation coefficient.

Some specific methods of carrying out the invention will now be described by way of example.

Example I

A prepared phosphor having a prefiring composition of ZnS, with 0.5% Cu and .3–.4% Cl was placed in an evaporation boat within a vacuum chamber. A substrate of conductive glass was placed in a substrate holder and positioned above the evaporation boat. The substrate was then heated to approximately 210° C. While the substrate was maintained at this temperature, the phosphor was vaporized and condensed on the surface of the substrate. The evaporation was continued for 45 minutes with a boat-to-substrate distance of 25 cm. to obtain a film thickness of between about 3 microns and 4 microns.

The deposition was controlled in the following manner: A separate evaporation is made from the boat upon test substrates at accurately-known distances and heating currents for known lengths of time. From this, rates of evaporation are determined and relative rates of simultaneous deposition when a host material and activating material are evaporated simultaneously from separate boats. Evaporation may then be carried out at a predetermined current and boat-to-substrate distance to give a particular phosphor thickness. By so doing, the evaporation conditions are substantially constant except for the alteration of the substrate temperature.

In other respects, the procedure and apparatus used was similar to that in the copending application of Winston, Serial No. 779,784, filed on December 11, 1958.

The phosphor film thus formed when placed in an electric field or subjected to cathode ray excitation exhibited a green emission.

*Example II*

This example was similar to Example I in all respects except that the substrate was maintained at approximately 275° C. The phosphor film thus formed when placed in an electric field or subjected to cathode ray excitation exhibited a blue emission.

*Examle III*

This example was similar to Example I in all respects except that the substrate was unevenly heated to give a temperature gradient across the substrate ranging from 210° C. at one end to 275° C. at the other end. The phosphor film thus formed when placed in an electric field or subjected to cathode ray excitation exhibited a color emission ranging from green to blue corresponding to the substrate temperature gradient 210° C. to 275° C.

While the present invention has been described with reference to particular embodiments thereof, it will be understood that numerous modifications may be made by those skilled in the art without actually departing from the invention.

What is claimed is:

1. A method of controlling the color of electroluminescent phosphors wherein a host material consisting of zinc sulfide together with activating materials consisting of copper and chlorine are vaporized and condensed in vacuum on a substrate to produce a color-emitting electroluminescent phosphor comprising controlling the accommodation coefficients of said activating materials by heating said substrate by radiation to a temperature between 80° C. and 300° C., said accommodation coefficient effecting the amounts of said activating materials and the ratios of said activating materials deposited to provide a phosphor film having an energy level structure producing a color-emitting wavelength when subjected to an electric field, said energy level structure and resulting color-emitting wavelength being a function of the substrate temperature.

2. The process of claim 1 wherein the substrate is maintained at a temperature of about 210° C. to provide a phosphor film which emits green light.

3. The process of claim 1 wherein the substrate is maintained at a temperature of about 275° C. to provide a phosphor which emits blue light.

4. A method of controlling the color of electroluminescent phosphors comprising arranging within a vacuum chamber a suitable substrate, vaporizing within said chamber a prepared phosphor consisting of zinc sulfide activated with copper chloride, heating said substrate to provide a temperature gradient across said substrate, said temperature gradient being selected to have, as a lower limit, a temperature sufficiently high to promote crystal growth of said zinc sulfide and permit accommodation in said crystal growth of the copper chloride and having as an upper limit a temperature sufficiently high to reduce the accommodation coefficient of the copper chloride in said crystal growth in relation to said lower limit and condensing said prepared phosphor on said substrate to give an electroluminescent phosphor having a color change from green at said lower limit to blue at said upper limit.

References Cited in the file of this patent

UNITED STATES PATENTS

| | | |
|---|---|---|
| 2,600,579 | Ruedy et al. | June 17, 1952 |
| 2,659,678 | Cusand et al. | Nov. 17, 1953 |
| 2,732,312 | Young | Jan. 24, 1956 |
| 2,867,541 | Coghill et al. | Jan. 6, 1959 |
| 2,898,225 | Rychlewski et al. | Aug. 4, 1959 |
| 2,898,226 | Evans et al. | Aug. 4, 1959 |
| 2,924,732 | Lehmann | Feb. 9, 1960 |
| 2,955,958 | Brown | Oct. 11, 1960 |
| 2,967,111 | Coghill et al. | Jan. 3, 1961 |

OTHER REFERENCES

Leverenz: "Luminescence of Solids" (1950), Wiley, N.Y., p. 101.

Luminescence, British Journal of Applied Physics, Supplement No. 4 (1955), pp. S34 to S36.